(12) United States Patent
Matsuoka et al.

(10) Patent No.: US 7,444,529 B2
(45) Date of Patent: Oct. 28, 2008

(54) MICROCOMPUTER HAVING REWRITABLE NONVOLATILE MEMORY

(75) Inventors: Toshihiko Matsuoka, Nukata-gun (JP); Hideaki Ishihara, Okazaki (JP); Yukari Sugiura, Yokohama (JP)

(73) Assignee: DENSO CORPORATION, Kariya (JP)

( * ) Notice: Subject to any disclaimer, the term of this patent is extended or adjusted under 35 U.S.C. 154(b) by 431 days.

(21) Appl. No.: 11/238,106

(22) Filed: Sep. 29, 2005

(65) Prior Publication Data

US 2006/0069933 A1 Mar. 30, 2006

(30) Foreign Application Priority Data

Sep. 29, 2004 (JP) .............................. 2004-284061
Jul. 6, 2005 (JP) .............................. 2005-197519

(51) Int. Cl.
*G06F 1/32* (2006.01)

(52) U.S. Cl. ........................ 713/322; 713/323; 713/601

(58) Field of Classification Search ................. 713/300, 713/320, 322–324, 500, 600, 601
See application file for complete search history.

(56) References Cited

U.S. PATENT DOCUMENTS 5,444,664 A * 8/1995 Kuroda et al. ............... 365/226
5,550,489 A * 8/1996 Raab ........................... 326/93
5,708,395 A 1/1998 Yamauchi et al.
5,789,985 A 8/1998 Yamauchi et al.
2004/0158761 A1 8/2004 Matsuoka et al.
2005/0091550 A1* 4/2005 Tani ........................... 713/320

FOREIGN PATENT DOCUMENTS

| JP | A-H06-203183 | 7/1994 |
| JP | A-H06-231280 | 8/1994 |
| JP | A-2000-357947 | 12/2000 |

* cited by examiner

*Primary Examiner*—Dennis M Butler
(74) *Attorney, Agent, or Firm*—Posz Law Group, PLC

(57) ABSTRACT

A CPU, when shifting to a sleep mode, discontinues the oscillating operations of an oscillation circuit and of a frequency multiplier circuit through a low power consumption control circuit. A flash power source circuit discontinues the oscillating operations of the circuits or interrupts or resumes the supply of an external power source in response to resumption of the halted operation. When the CPU is to be shifted to the sleep mode, the frequency multiplier circuit holds the set oscillation control conditions. When the oscillating operation is to be resumed, operates based on the oscillation control conditions that are held. When the sleep mode is reset, the CPU makes access to the mask ROM and immediately reads out a control program that is to be executed right after the wakeup.

5 Claims, 14 Drawing Sheets

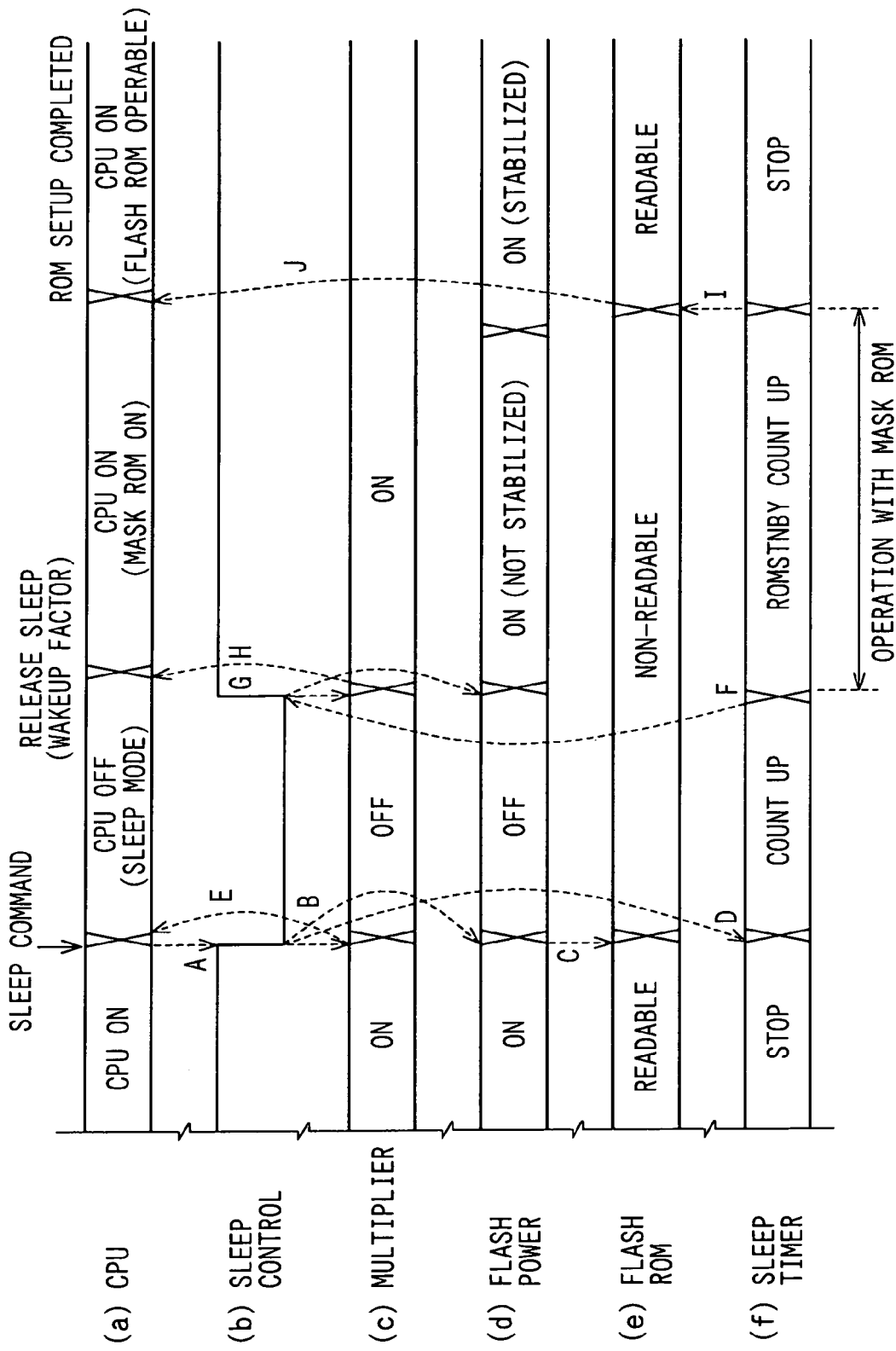

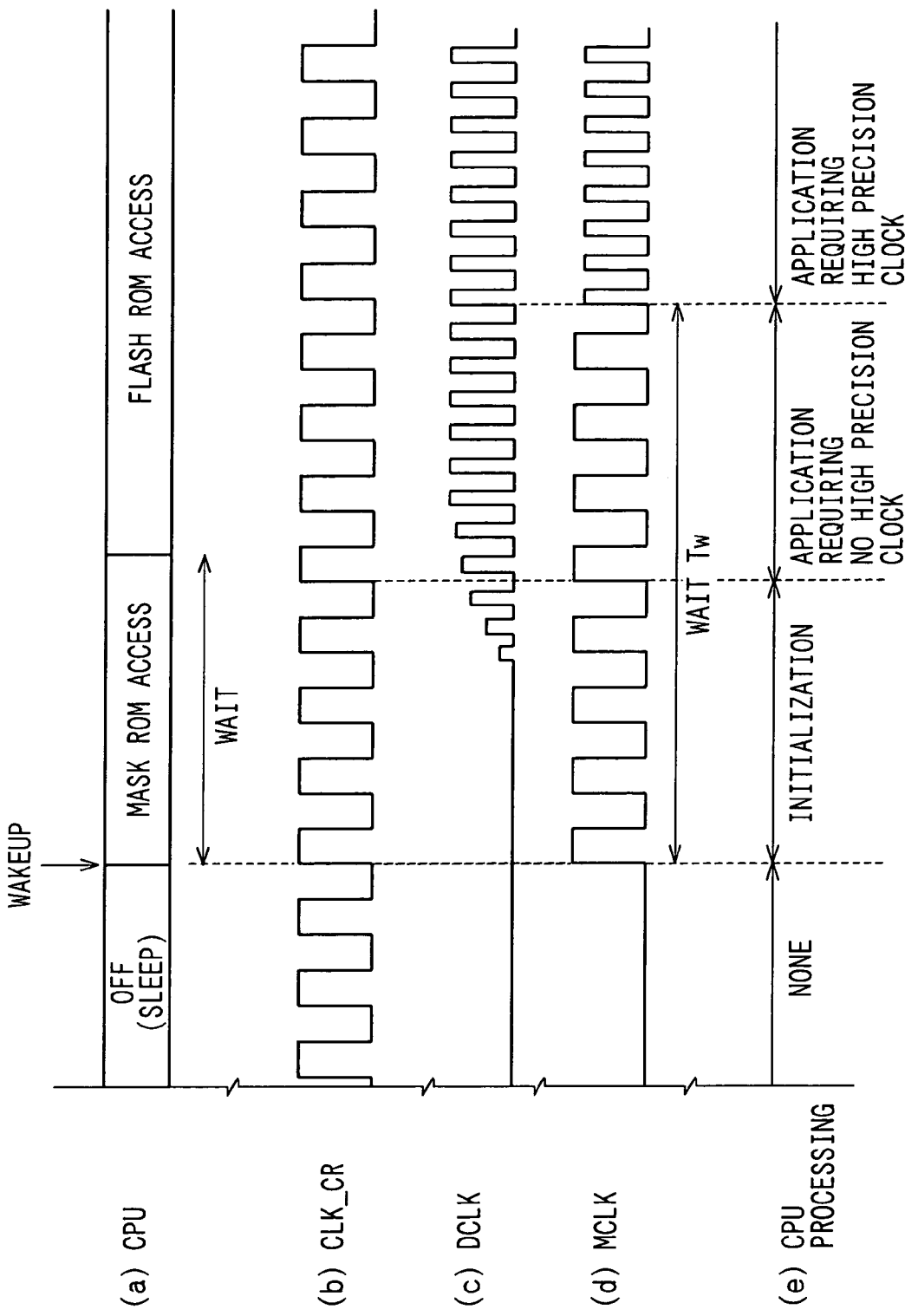

MICROCOMPUTER HAVING REWRITABLE NONVOLATILE MEMORY

CROSS REFERENCE TO RELATED APPLICATION

This application is based on and incorporates herein by reference Japanese Patent Applications No. 2004-284061 filed on Sep. 29, 2004 and No. 2005-197519 filed on Jul. 6, 2005.

FIELD OF THE INVENTION

This invention relates to a microcomputer equipped with a CPU which operates upon reading a control program stored in a rewritable nonvolatile memory, and can be shifted to a low power consumption mode.

BACKGROUND OF THE INVENTION

Some microcomputers are so constructed that, when no event is processed for a predetermined period of time, the operation of the clock control circuit is discontinued to thereby discontinue the operation of the CPU. Thus, the CPU, too, is shifted to a low power consumption mode. Once having been shifted to the low power consumption mode, the operation of the clock control circuit is resumed at a time point when an event to be processed occurs, and the CPU starts.

The above clock control circuit is often constructed to execute digital oscillation operation by utilizing, for example, a ring oscillator and a digital PLL, enabling a clock frequency to be set. In the thus constructed clock control circuit, the period of reference clock signals produced by an oscillator is measured based on the clock signals of the ring oscillator having a very high frequency, and the frequency of the reference clock signals is multiplied to obtain clock signals of a predetermined frequency.

Therefore, if the operation of the clock control circuit is discontinued after being shifted to the low power consumption mode, the measured data of the period of the reference clock signals on which the clock signals are based, is reset. Therefore, to start again the CPU after the low power consumption mode is reset, the start sequence is commenced after waiting for the oscillator to be stabilized and after measuring the period of the reference clock signals. The time required for the measurement accounts for a delay in starting the CPU again.

For this reason, JP-A-6-203183 proposes to feed clock signals to a microcomputer from an external unit that does not require the time for stabilizing the oscillation, and immediately resets the ultra-low power consumption mode when a signal requesting the reset of the STOP mode is generated.

In some microcomputers, a control program is stored in a rewritable nonvolatile memory such as a flash ROM to facilitate the development of a control program. In order to read and write the data, further, the flash ROM needs a voltage level different from the power source voltage of a general logic circuit and, hence, needs a dedicated power source circuit. It is however a prerequisite to feed clock signals from an external unit, which, therefore, will become quite useless if it is not allowed to employ the above prerequisite due to the system construction.

Further, when the microcomputer is shifted to the low power consumption mode, the control program is not read out and, hence, no electric power is fed to the flash ROM. Therefore, when the CPU is restarted by resetting the low power consumption mode, the CPU is not accessible until the power source circuit for the flash ROM is started to form a power source voltage necessary for the reading operation. Accordingly, the time required for starting the power source circuit in the flash ROM, too, is a factor of delaying the restart of the CPU.

SUMMARY OF THE INVENTION

It is therefore an object to provide a microcomputer which enables a CPU to quickly resume processing when the low power consumption mode is reset in a construction where the control program for the CPU is stored in a nonvolatile memory.

A microcomputer has a rewritable nonvolatile memory, a clock control circuit and a CPU. The rewritable nonvolatile memory has a power source circuit forming a power source for own operation thereof based on a power source fed from an external unit and stores a control program. The clock control circuit is so constructed to selectively produce first clock signals that start relatively quickly from an oscillation halt state and has a relatively low oscillating precision and second clock signals that start relatively being delayed from the oscillation halt state and has a relatively high oscillating precision. At least the second clock signals are produced using an oscillation output of an external oscillator as reference clocks. The CPU receives the clock signals produced by the clock control circuit and operates upon reading out the control program from the nonvolatile memory.

The CPU discontinues the oscillating operation of at least the second clock signals in the clock control circuit when the CPU is shifted to a low power consumption mode. The power source circuit of the nonvolatile memory is so constructed to interrupt the external power source when the CPU is shifted to the low power consumption mode and resume supply of the external power source when the low power consumption mode is reset. The control program read by the CPU when the low power consumption mode is reset is partly pre-arranged in a start memory which is capable of reading the data at a time point when the mode is reset. The clock control circuit resumes, when the low power consumption mode is reset, the operation for oscillating at least the second clock signals, feeds to the CPU the first clock signals of which the oscillation is in a stable state for only a predetermined period of time and, thereafter, feeds the second signals instead thereto. The CPU reads the control program arranged in the start memory when started as a result of resetting the low power consumption mode.

BRIEF DESCRIPTION OF THE DRAWINGS

The above and other objects, features and advantages of the present invention will become more apparent from the following detailed description made with reference to the accompanying drawings. In the drawings:

FIG. 10 is a timing chart corresponding to the flowchart of FIG. 9 when the mask ROM is selected as a start memory in the first embodiment;

FIG. 15 is a timing chart of the third embodiment and illustrating the third embodiment corresponding to FIG. 10.

DETAILED DESCRIPTION OF THE PREFERRED EMBODIMENTS

First Embodiment

Figure 1:
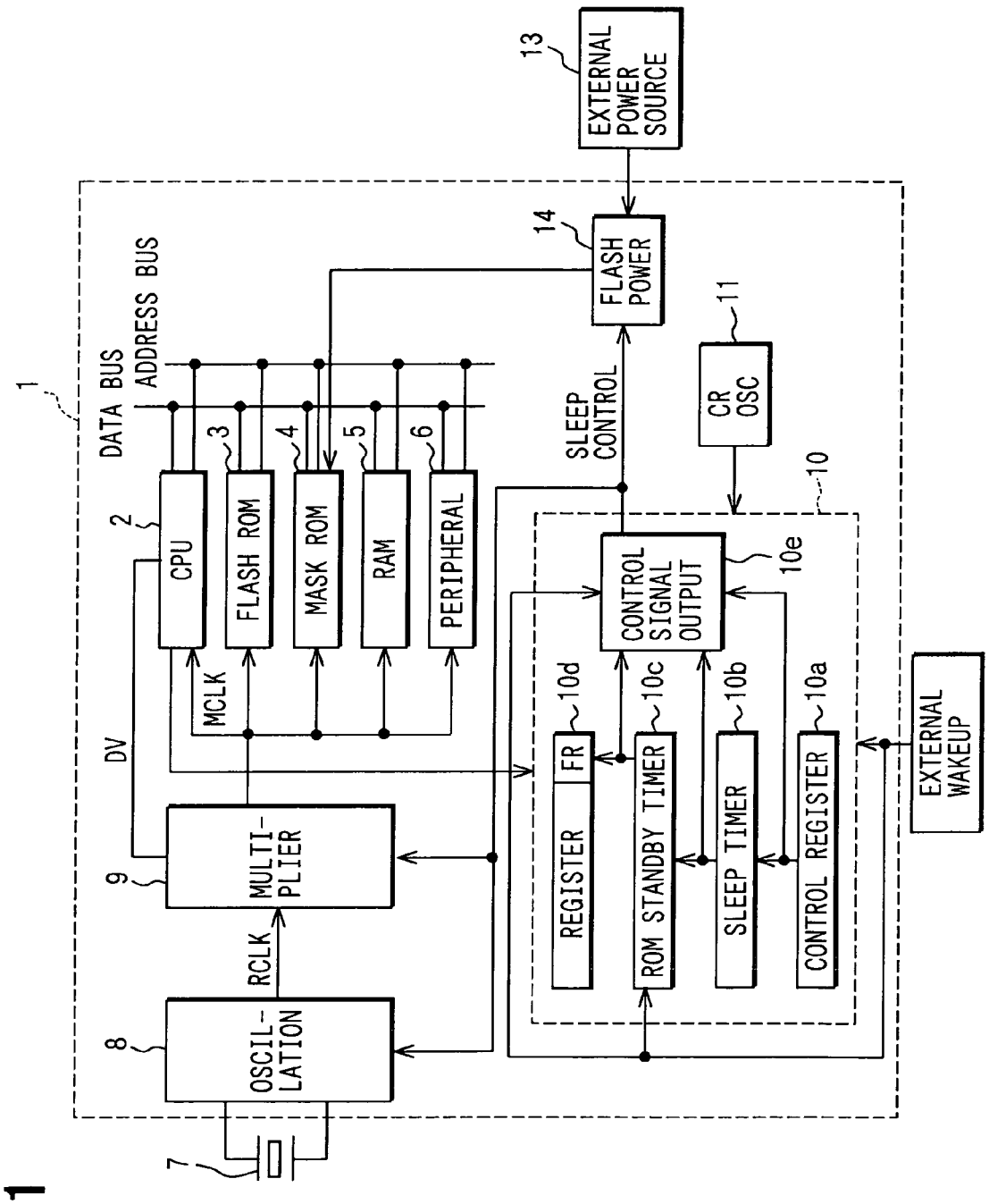
FIG. 1 is a functional block diagram illustrating an electric construction of a microcomputer for a vehicle including a microcomputer according to a first embodiment of the present invention.

Referring first to FIG. 1, a microcomputer is designated as an electronic control unit (ECU) 1 for vehicles. The basic portions of the construction are known in US 2004/0158761A1 (JP-A-2004-213197) or JP-A-2000-357947 and are, hence, described below only briefly. The ECU 1 is constructed as a semiconductor integrated circuit (IC) and includes a CPU 2, a flash ROM (nonvolatile memory) 3, a mask ROM (start memory) 4, a random access memory (RAM) 5 and other peripheral circuits (e.g., gate array, A/D converter, communication interface, etc.) 6 as internal circuits. These circuits are connected together via an address bus and a data bus. The flash ROM 3 stores the control program for the CPU 2, and the mask ROM 4 stores, in advance, a part of the control program which is temporarily accessible by the CPU 2 when the low power consumption mode is reset.

A quartz oscillator (external oscillator) 7 is attached to the ECU 1, and an oscillation circuit (reference clock generating circuit) 8 biases the quartz oscillator 7 to produce reference clock signals RCLK of a frequency of 25 kHz. The reference clock signals RCLK are applied to a frequency multiplier circuit (clock control circuit) 9 which forms clock signals MCLK by multiplying the reference clock signals RCLK, and outputs them to the clock input terminals of the CPU 2, memories 3 to 5 and peripheral circuit 6. The frequency multiplier circuit 9 is constructed as a digital phase locked loop (DPLL) circuit, and its multiplication is set depending upon a value of the multiplication-setting data DV applied from the CPU 2.

A low power consumption control circuit 10 sends a sleep control signal SC (stop control) to the frequency multiplier circuit 9 to change the operation mode of the ECU 1 over to a low power consumption mode and a normal mode. In response to an instruction from the CPU 2, the low power consumption control circuit 10 produces the sleep control signal SC of a low level to maintain the ECU 1 in the low power consumption mode (sleep/stop).

Once the operation mode is changed over to the low power consumption mode, the low power consumption control circuit 10 maintains this mode until a sleep timer incorporated therein counts up or until there occurs any external wakeup factor (e.g., key of a vehicle inserted in a key cylinder is detected by a key detector switch). When the wakeup factor arises, the sleep control signal SC of a high level is produced to change the ECU 1 from the low power consumption mode over to the normal operation mode.

The low power consumption control circuit 10 operates based on low speed clock signals of a frequency of, for example, about 25 kHz produced from a CR oscillation circuit 11, and is constructed with a control register 10a, a sleep timer 10b, a ROMSTNBY timer (access inhibition timer) 10c, a status register 10d and a control signal output unit 10e. Though not shown in FIG. 1, the CPU 2 and the low power consumption control circuit 10 are connected together through an address bus and a data bus, and the CPU 2 is capable of writing and reading data to and from the internal register.

The control register 10a is the one into which a command is written by the CPU 2 and depending upon its set point, the timing for producing the sleep control signal SC from a control signal output unit 10e is determined. When set to the sleep mode through the control register 10a, the sleep timer 10b counts a predetermined period for shifting into sleep. The ROMSTNBY timer 10c starts the counting operation when the sleep timer 10b starts counting up or when an external wakeup factor appears, and counts a start setup period (inhibition period) from when the external power source 13 feeds power to the flash power source circuit 14 until when the power source for operation is formed for the flash ROM 3. The start setup period is set to be, for example, about 41 CR clocks (40 μs×41=1630 μs). The external power source 13 feeds the power source for operation of about 5 V to other constituent elements such as CPU 2 constituting the ECU 1.

The status register 10d can be read by the CPU 2. When the ROMSTNBY timer 10c starts counting, the flag ROMSTNBY is set. When the timer 10c counts up, the flag is reset. The control signal output unit 10e receives count-up signals from the sleep timer 10b and the ROMSTNBY timer 10c as well as external wakeup factor signals, and produces a sleep control signal SC based on the timings for producing the signals and the set point of the control register 10a.

Figure 2:
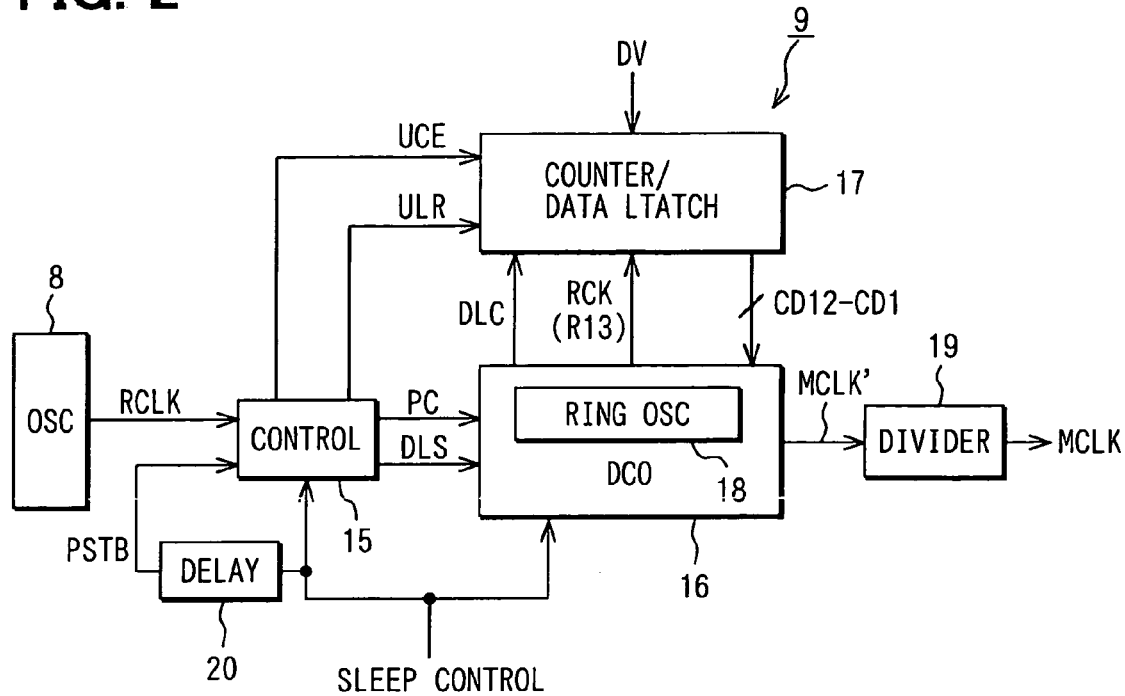
FIG. 2 is a functional block diagram schematically illustrating a frequency multiplier circuit in the first embodiment.

The frequency multiplier circuit 9 is shown in FIG. 2. For more detailed description, reference may be had to U.S. Pat. Nos. 5,789,985 U.S. Pat. No. 5,708,395 (JP-A-8-265111). Reference clock signals RCLK are fed to a control circuit 15 from an oscillation circuit 8. The control circuit 15 incorporates a sequence counter constructed with three flip-flops (not shown). The sequence counter counts the number of input pulses of reference clock signals RCLK, regards 8 periods of the reference clock signals RCLK as a sequence control period, and outputs various control timing signals to a DCO (digital controlled oscillator) 16 and to a counter/data latch circuit 17 in synchronism with the reference clock signals RCLK.

Figure 4:
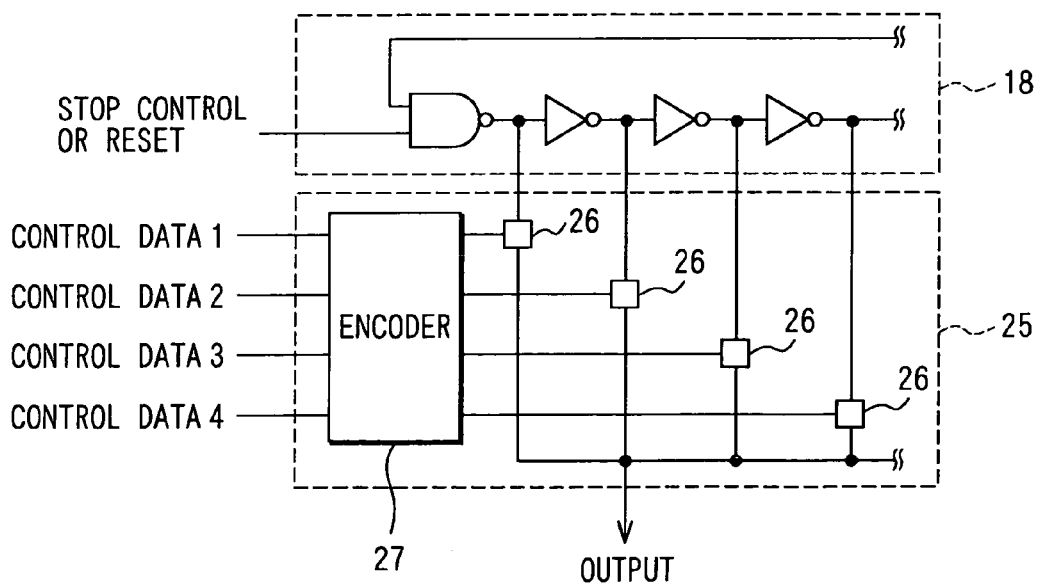
FIG. 4 is a circuit diagram illustrating a pulse selector in the first embodiment.

The DCO 16 includes a ring oscillator 18 therein. The ring oscillator 18 is so constructed that the output terminals of a plurality of logic inverter circuits are connected to the input terminal of the next stage like a ring as shown in FIG. 4, and the start/stop of oscillation operation can be controlled by a stop control signal from an external unit. Multi-phase clock signals R1 to R16 are output from the output terminals of the logic inverter circuits.

Control timing signals UCE and ULR are applied to the counter/data latch circuit 17 from the control circuit 15. The control timing signals UCE and ULR have a pulse width corresponding to a period of the reference clock signal RCLK, and are output in the third and seventh periods of the sequence control periods in the control circuit 15.

To the counter/data latch circuit 17 are further added clock signals R13 as RCK from the ring oscillator 18. An up-counter (16 bits) in the circuit 17 effects the counting operation based on the clock signals RCK. While the control timing signal UCE is being output, the counter/data latch circuit 17 permits the counter to effect the up-counting operation so as to count the time corresponding to a period of the reference clock signal RCLK based on the clock signals RCK. The counted data is latched at a timing of a latch signal DLC at which the control timing signal DLS output from the control circuit 15 at the fifth period in the sequence control periods is applied through the DCO 16. When the control timing signal ULR is output, the latched data is cleared.

The counter/data latch circuit 17 shifts the data DT16 through DT1 of 16 bits which it has counted toward the right depending upon the multiplication-setting data DV applied from the CPU 2, and latches 12 bits of the data after shifted. The data of 12 bits that are latched are output as CD12 to CD1 to the DCO 16. The multiplication clock signals MCLK' output from the DCO 16 are divided into two through a frequency divider circuit 19 for adjusting the duty ratio, and are output as multiplication clock signals MCLK. The sleep control signal SC is further applied to the control circuit 15, and is, further, applied as an operation start signal PSTB to the control circuit 15 via a delay circuit 20 which gives a delay time equal to about one period of the reference clock signal RCLK.

Figure 3:
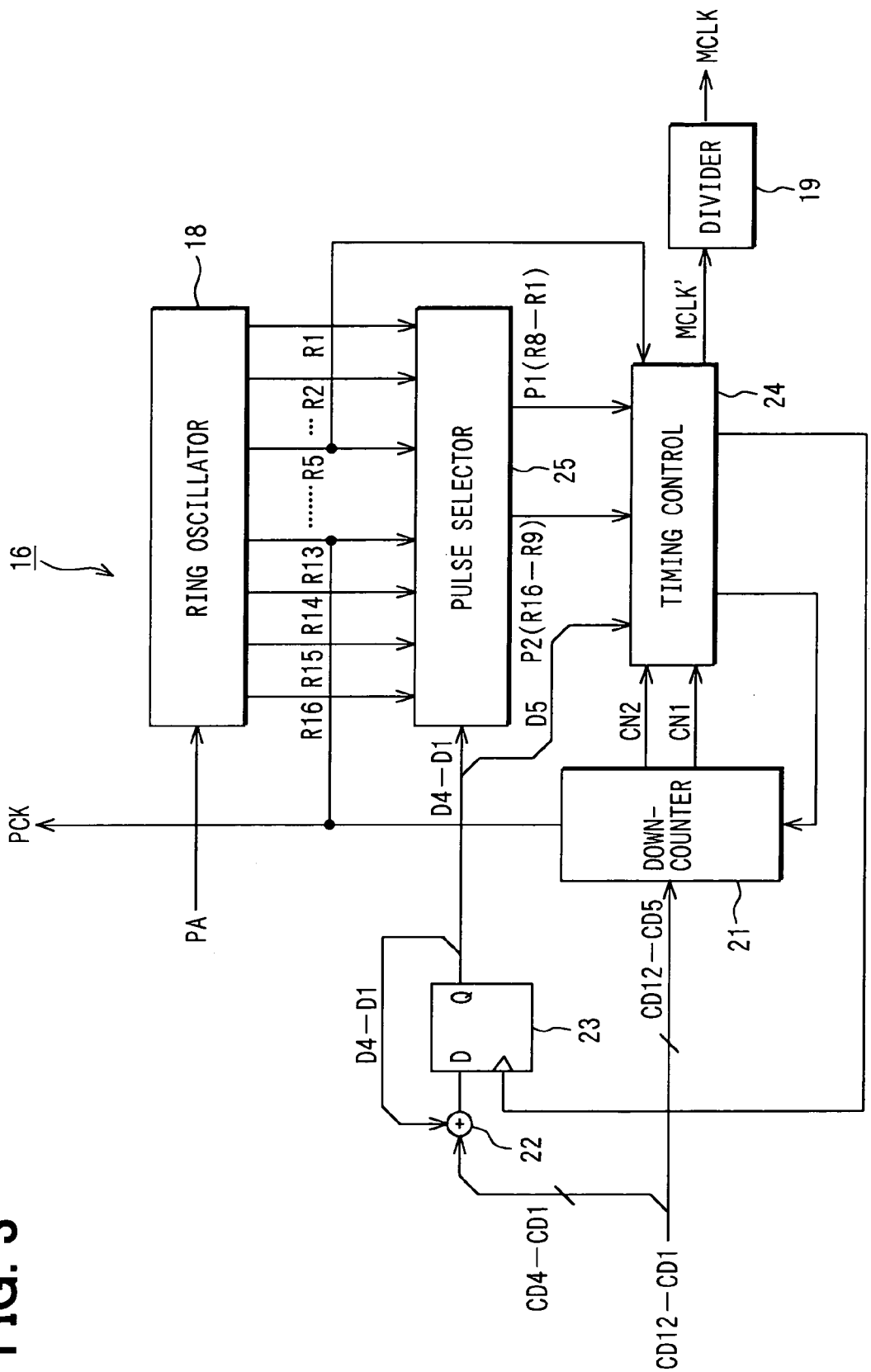
FIG. 3 is a functional block diagram illustrating a DCO in the first embodiment.

As shown in FIG. 3, of the latched data CD12 to CD1 applied from the counter/data latch circuit 17, the data CD12 to CD5 of upper (more significant) 8 bits are loaded at a predetermined timing as counted data of the down-counter 21. The down-counter 21 counts down the counted data loaded by the clock signals R13 output from the ring oscillator 18.

Of the latched data CD12 to CD1, further, the data CD4 to CD1 of lower (less significant) 4 bits are applied to a data input terminal D of the register 23 via an adder 22. The register 23 outputs the data of the adder 22 as data D5 to D1 of 5 bits in response to timing signals output from a timing control unit 24. Among them, the data D4 to D1 of the lower 4 bits are applied to a pulse selector 25, and are further input as to-be-added values to the adder 22. Further, the data D5 output from the register 23 corresponds to a carry signal generated depending upon the addition at the adder 22, and is fed to the timing control unit 24.

Multi-phase clock signals R16 to R1 output from the ring oscillator 18 are applied to the pulse selector 25. From these multi-phase clock signals R16 to R1, there is selected any one corresponding to a value of data D4 to D1 (number corresponding to (decimal value+1)) output from the register 23, which is output to the timing control unit 24 from either the output terminal P1 (R8 to R1) or P2 (R16 to R9). A clock signal R5 output from the ring oscillator 18 is applied to the timing control unit 24.

The down-counter 21 counts down the count data that are loaded, produces an output signal CN2 of a high level when the counted value becomes "2", produces an output signal CN1 of the high level when the counted value becomes "1", and outputs the signal to the timing control unit 24.

The circuit constructed as above generally operates as described below. Count data DT16 to DT1 corresponding to the period of the reference clock signals RCLK are counted for every 8 periods of the reference clock signals RCLK. Among them, the data CD12 to CD1 of 12 bits shifted to the right depending on the multiplication data DV are applied to the DCO 16. When CD12 to CD5 of upper 8 bits are counted down, any one of the multi-phase clock signals R16 to R1 corresponding to the value (+1) of the lower data D4 to D1 applied from the register 23 is selected and is output as a multiplication clock signal MCLK'.

Referring to FIG. 4, analog switches 26 are arranged in the pulse selector 25 in correspondence with the multi-phase clock signals R1 to R16. Any one of the plurality of analog switches 26 is encoded and is alternatively turned on by an encoder 27 based on the control data D1 to D4, and any one of the multi-phase clock signals R1 to R16 is output to a timing control unit 91.

Figure 5:
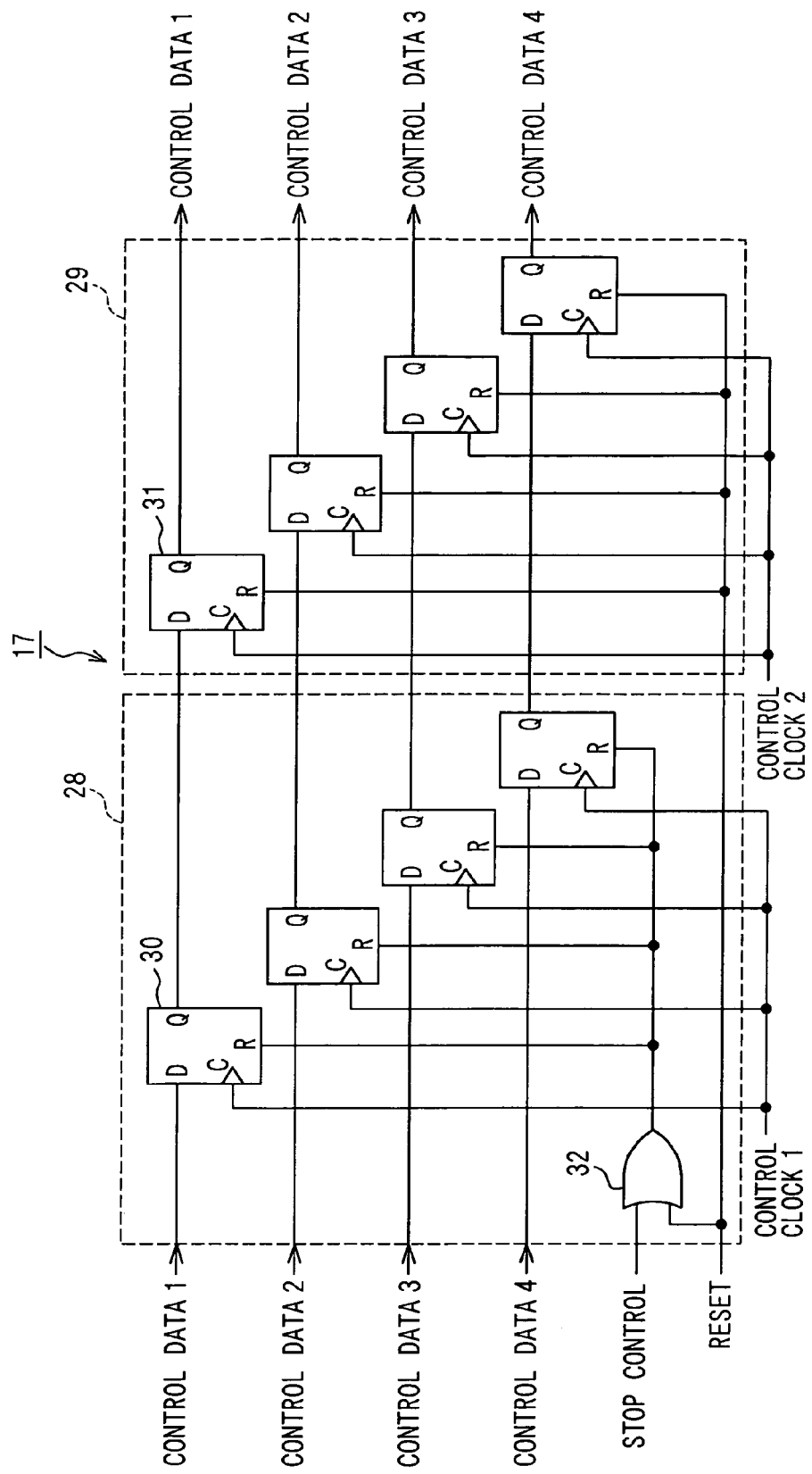
FIG. 5 is a circuit diagram illustrating a part of a counter/data latch circuit in the first embodiment.

A part of the internal construction of the counter/data latch circuit 17 is shown in FIG. 5. The control data CD12 to CD1 (CD4 to CD1 only are illustrated) are held by a double-latch construction of a frequency-setting circuit portion 28 and a frequency data-holding circuit portion (data-holding means) 29. These circuit portions 28 and 29 are constructed with flip-flops 30 and 31, respectively, and control clocks 1 and 2 are fed to the clock input terminals thereof.

A reset signal is applied to a reset terminal R of the flip-flop 30 that forms the frequency-setting circuit portion 28. Further, a reset signal and a stop control signal during the low power consumption mode are applied, through an OR gate 32, to a reset terminal R of the flip-flop 31 that forms the frequency data-holding circuit portion 29. During the normal operation, the frequency data-holding circuit portion 29 is used for bringing into synchronism again with a control clock 2 the control data 1 to 4 synchronized and held by the frequency-setting circuit portion 28 by a control clock 1.

Figure 6:
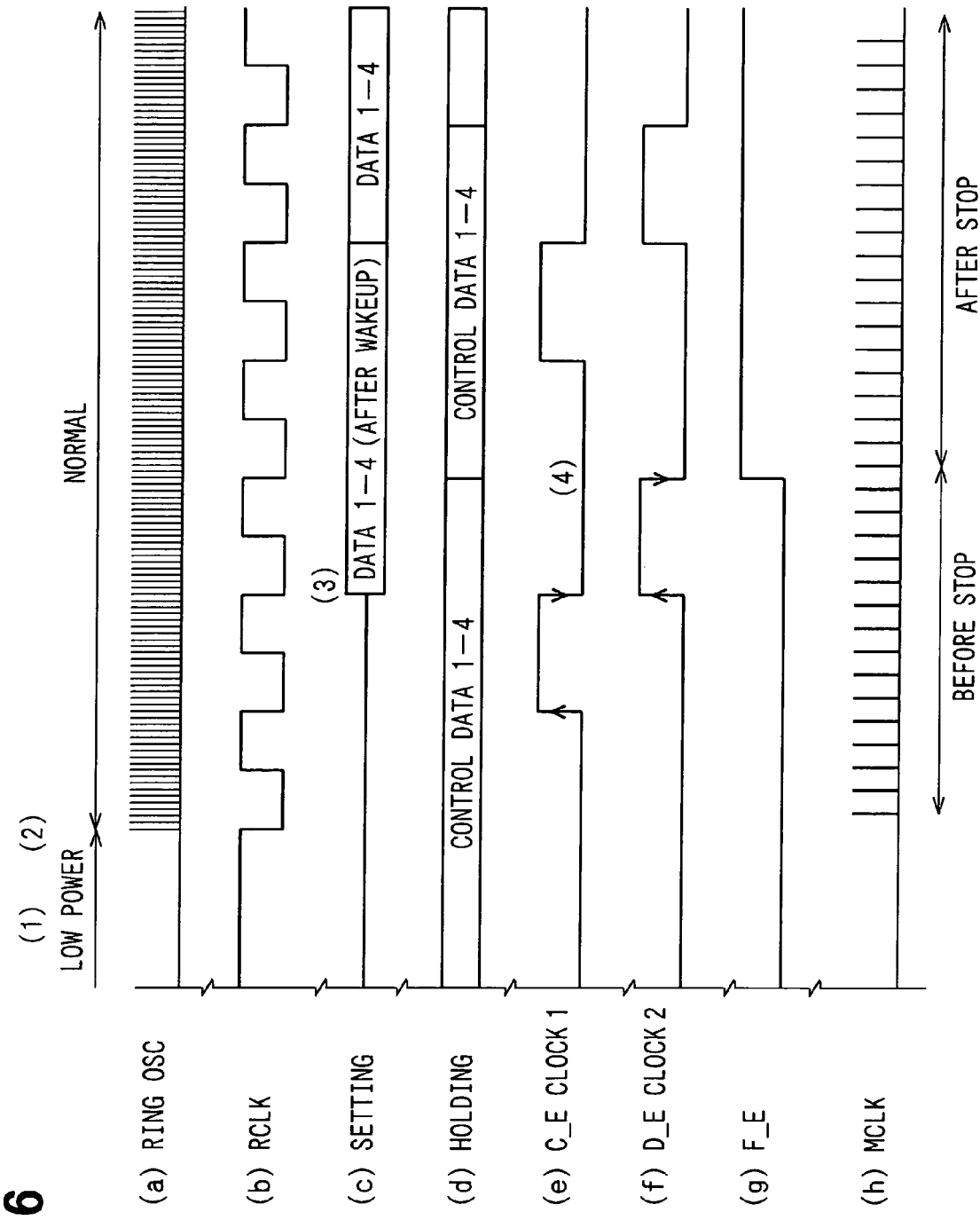
FIG. 6 is a timing chart illustrating a state where the frequency multiplying circuit starts from a state of a low power consumption mode to undergo the oscillating operation in the first embodiment.

FIG. 6 is a timing chart illustrating a case where the frequency multiplying circuit 9 starts from a state of a low power consumption mode to undergo the normal oscillating operation. In the low power consumption mode (1), the ring oscillator 18 and the oscillation circuit 8 are not effecting the oscillating operation. When the low power consumption mode is reset at (2), they commence the oscillating operation. In the low power consumption mode, further, the data is reset in the frequency-setting circuit portion 28 but the data is held in the frequency data-holding circuit portion 29. The data that is held is the one (oscillation control condition) used for the oscillating operation by the frequency multiplying circuit 9 before being shifted to the low power consumption mode (1), and is the one for measuring the period of the reference clock signal of the oscillation circuit 8 using the clock signals of the ring oscillator 18.

Therefore, when the low power consumption mode is reset at (2), the frequency multiplying circuit 9 immediately commences the oscillating operation based on the data held in the frequency data-holding circuit portion 29 without measuring again the period of the reference clock signals. That is, the clock signal output at this time point corresponds to the first clock signal. When the control clock 1 (C_E) breaks at (3), the frequency-setting circuit portion 28 produces control data inputs 1 to 4 newly set by the CPU 2 after the wakeup, and the frequency data-holding circuit portion 29 latches the control data inputs 1 to 4 at the rise of the control clock 2 (D_E) and outputs the control data 1 to 4 newly set at the break (4). At (4), further, F_E which is an enable signal for the multiplied clock signal output (oscillating output) becomes active, and a clock signal MCLK is output to the CPU 2. That is, the clock signal output at this time point corresponds to the second clock signal.

Figure 7:
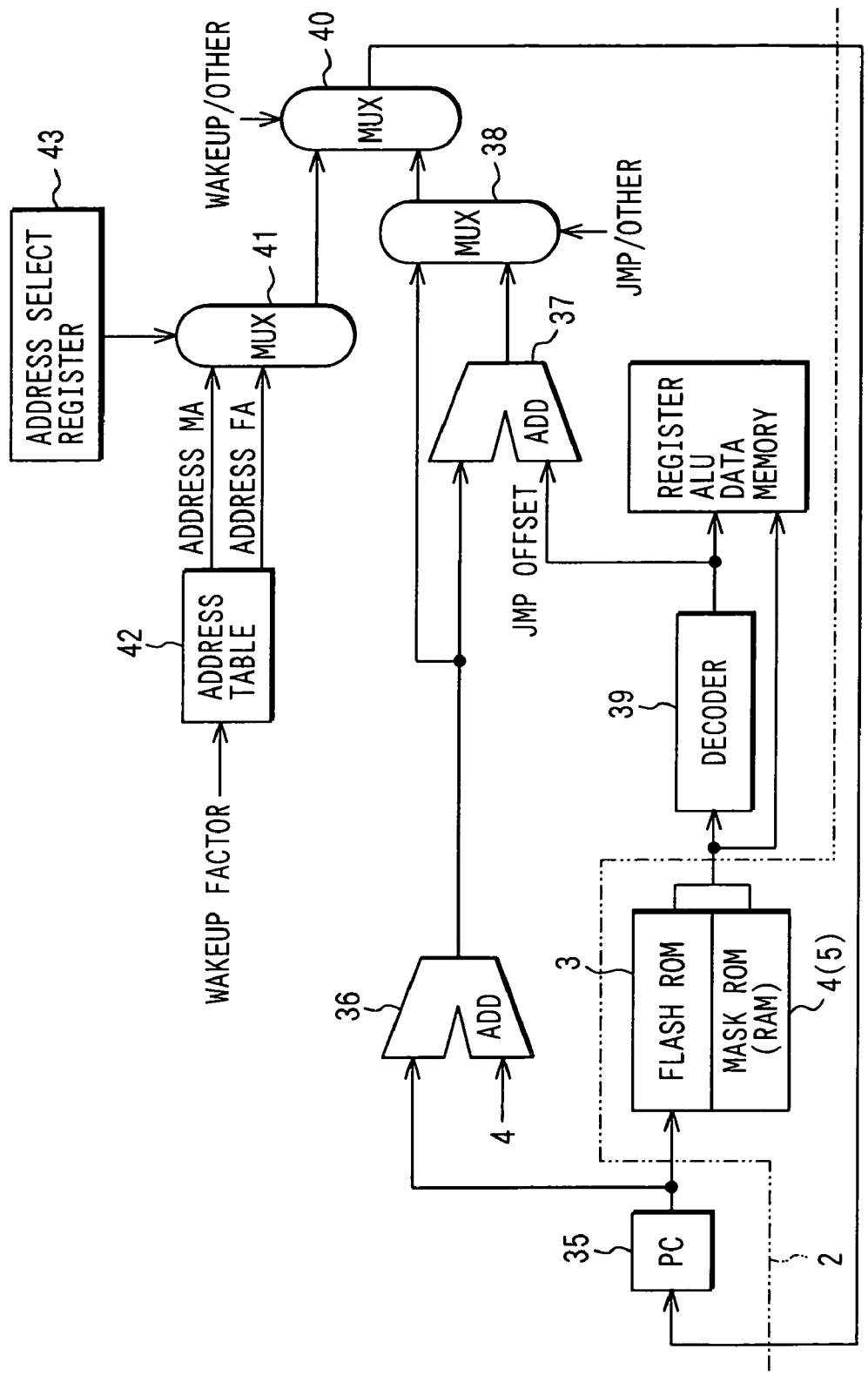
FIG. 7 is a functional block diagram illustrating only a part of a CPU in the first embodiment.

FIG. 7 is a diagram illustrating only a main part of the internal construction of the CPU. An address for reading the control program is set to a program counter (PC) 35. The address output from the program counter 35 is sent to an instruction memory (flash ROM 3 or a mask ROM 4 in this embodiment) which is on the outside of the CPU 2 and stores the control program. The above address is output to the adder 37 and to the multiplexer (MUX) 38 of the next stage when "4" which is an increment of a 4-bite access address is added thereto through an adder 36.

When the instruction read out from the above instruction memory is a branching instruction such as "Jmp", an offset of a branch destination address specified by the instruction is decoded through an instruction decoder 39 and is applied to the adder 37. Therefore, the address output from the adder 37 becomes a branch destination address obtained by adding an offset address to the output address of the adder 36, and is applied to the multiplexer 38. The input to the multiplexer 38 is selected depending upon the decoded result of the instruction decoder 39. When the input is the branching instruction "Jmp", the output address of the adder 37 is selected. When the input is other instruction, the output address of the adder 36 is selected.

The output address of the multiplexer 38 is applied to a multiplexer 40 (second multiplexer) of a next stage, and an output address of a multiplexer 41 (first multiplexer) is fed to the other input of the multiplexer 40. The multiplexer 41 receives, as inputs, an access address MA of the mask ROM 4 written in the address table 42 and an access address FA of the flash ROM 3.

The input to the multiplexer 4 is selected depending upon the write setting for the address selection register (memory selection register) 43. That is, when the low power consumption mode is reset, the data are so written that the access address FA is selected by setting the address selection register 43 when the CPU 2 is accessible to the flash ROM 3 and the address MA is selected when the CPU 2 is accessible to the mask ROM 4.

Figure 8A:
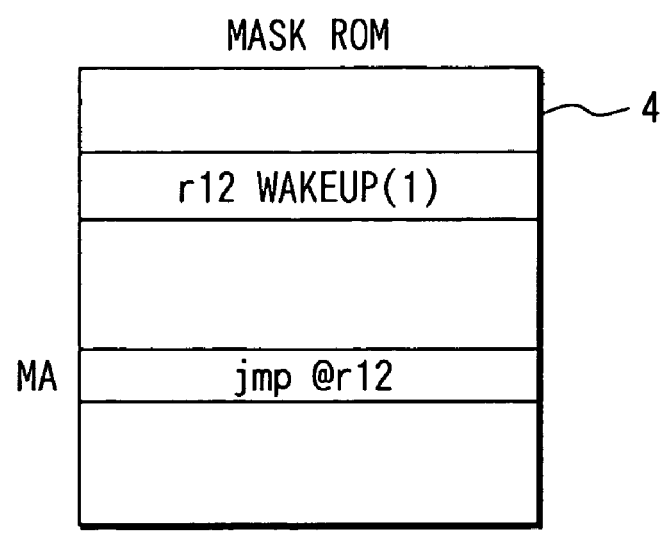
FIG. 8A is a schematic diagram of a mask ROM in the first embodiment.
Figure 8B:
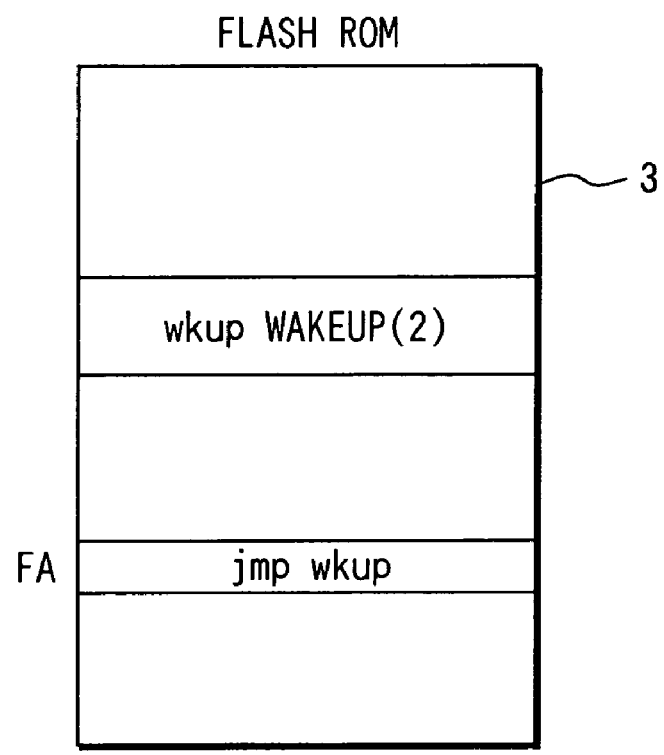
FIG. 8B is a schematic diagram of a memory map in a flash ROM in the first embodiment.

FIGS. 8A and 8B show schematic memory maps of the mask ROM 4 and the flash ROM 3. In the mask ROM 4, a branching instruction "jmp @r12" is arranged in the address MA, and the address specified by a register r12 is specified as a wakeup vector. In the flash. ROM 3, on the other hand, a branching instruction "jmp wkup" is arranged in the address FA, and the address specified by a label wkup serves as a wakeup vector.

Figure 9:
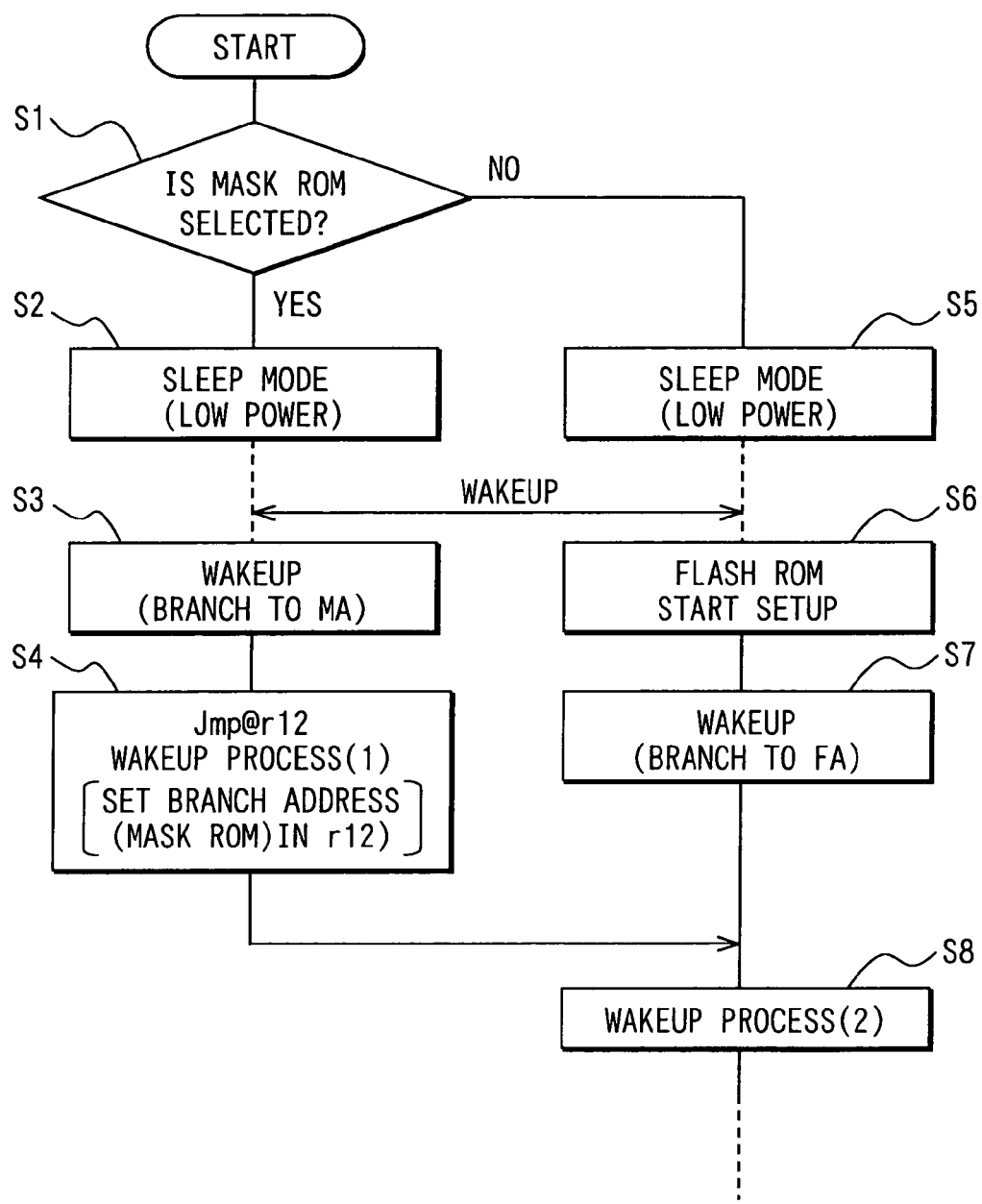
FIG. 9 is a flowchart illustrating processing of when the operation mode is changed by the CPU in the first embodiment.

FIG. 9 is a flowchart illustrating the processing of when the operation mode is changed by the CPU 2 like normal operation mode→sleep (low power consumption) mode→wakeup→normal operation mode. A case where the ECU 1 for a vehicle is shifted to the sleep mode may be a case where event to be processed is hardly occurring like when the vehicle is parking.

Before being shifted to the sleep mode, the CPU 2 sets the address selection register 43 to select either the flash ROM 3 or the mask ROM 4 as an instruction memory that is to be accessed immediately after the wakeup (step S1). That is, when the flash ROM 3 is selected, the flash power source circuit 14 requires a start setup period. When the mask ROM 4 is selected, on the other hand, the above setup period is not necessary (canceled). The selection is set even for the low power consumption control circuit 10 via the bus.

When the flash ROM 3 is selected at step S1 (NO), the address FA side of the multiplexer 41 is selected in FIG. 7. Next, when the CPU 2 sets the writing for shift to the sleep mode onto the control register 10a in the low power consumption control circuit 10, the control signal output portion 10e activates the sleep control signal SC (time point A in (a) of FIG. 10), whereby the oscillation circuit 8, frequency multiplier circuit 9 and flash power source circuit 14 stop operation (time point B in (c) and (d) of FIG. 10). The CPU 2 stops its operation and is shifted into the sleep mode (FIG. 10). That is, the CPU 2 changes its operation from ON to OFF at time point A. While being shifted to the sleep mode, the watch dog timer discontinues its counting operation.

When the sleep timer 10b counts up or an external wakeup factor occurs while being shifted to the sleep mode (step S5), the low power consumption control circuit 10 stands by until the ROMSTNBY timer 10c counts up and until the start setup period elapses (step S6). After the above period has passed, the sleep control signal SC is inactivated to resume the operations of the oscillation circuit 8 and of the frequency multiplier circuit 9 to wake the CPU 2 up (step S7). At this time point, the multiplexer 40 temporarily selects the side of the multiplexer 41 and, hence, the address FA is set to the program counter 35. When woke up, therefore, the CPU 2 is branched to the address FA to access the flash ROM 3 and executes the wakeup processing (2) (step S8).

When the mask ROM 4 is selected at step S1 (YES), on the other hand, the address MA side of the multiplexer 41 is selected in FIG. 7. In the above case, there is no need of waiting for the passage of the start setup period. Therefore, if the wakeup factor occurs while being shifted to the sleep mode (step S2) (time point F in FIG. 10), the low power consumption control circuit 10 immediately inactivates the sleep control signal SC (step S3). Then, the frequency multiplier circuit 9 immediately commences the frequency multiplying operation to produce the clock signals (time point G in FIG. 10).

At this time point, the address MA is set to the program counter 35 through the multiplexers 40 and 41. When woke up, the CPU 2 is branched to the address MA to immediately access the mask ROM 3 thereby to execute the wakeup processing (1) (step S4). In this case, further, the ROMSTNBY timer 10c in the low power consumption control circuit 10 is counting the start setup period. Therefore, the CPU 2 makes reference to the status register 10d by polling and checks whether the ROMSTNBY flag is reset. When it is confirmed that the ROMSTNBY timer 10c has counted up and the ROMSTNBY flag is reset, the CPU 2 sets the program counter 35 to the address FA and proceeds to step S8 to execute the wakeup processing (2).

Figure 11A:
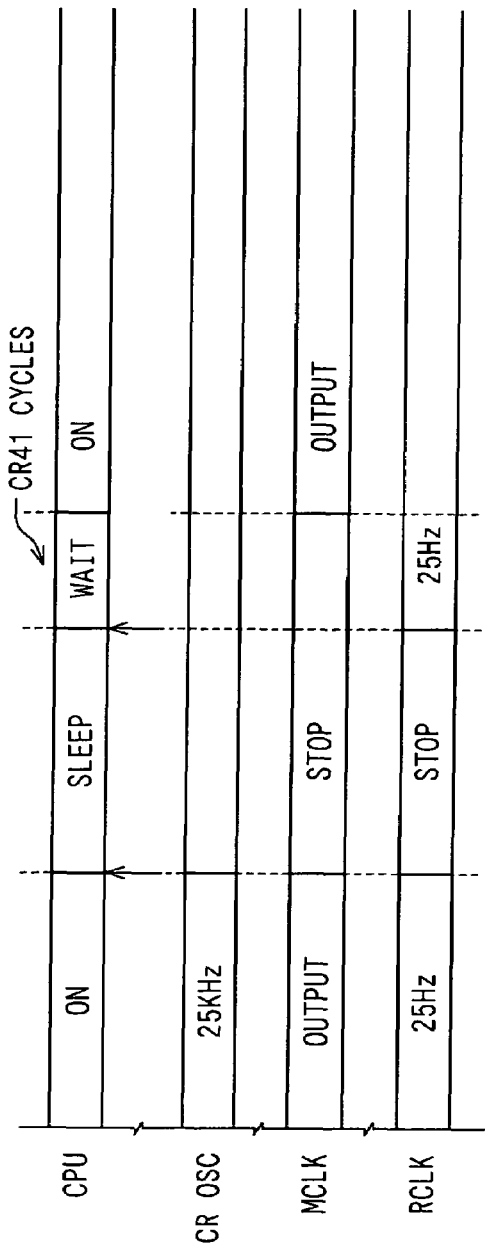
FIG. 11A is a timing chart illustrating the processing of when a sleep mode is reset concerning the case of a conventional construction.
Figure 11B:
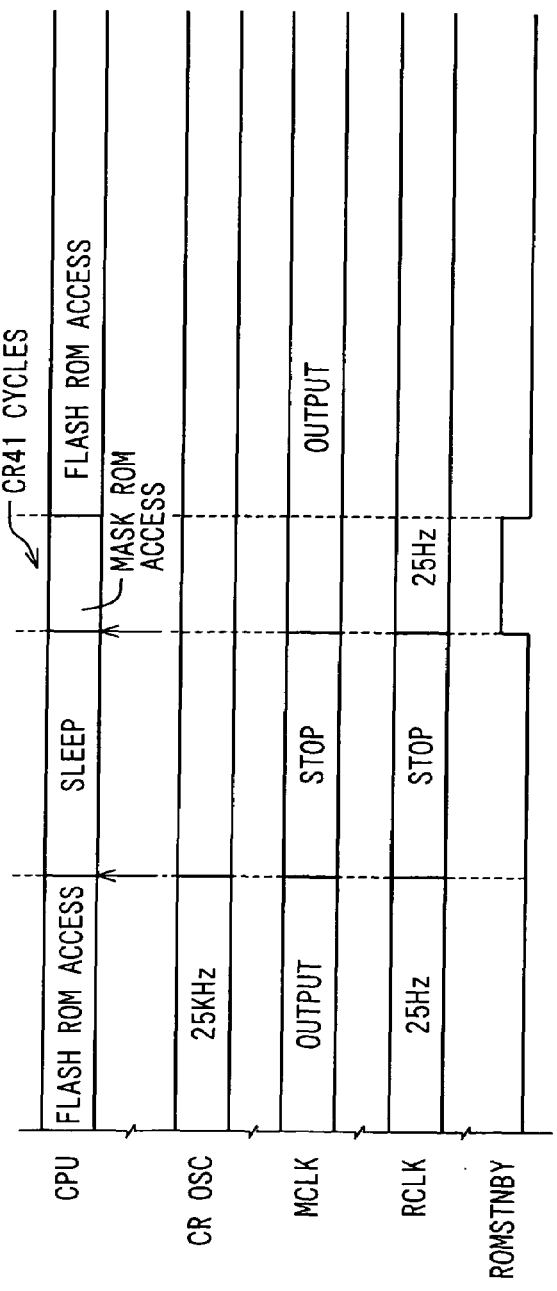
FIG. 11B is a timing chart illustrating the processing of when a sleep mode is reset concerning the case of the first embodiment.

FIG. 11A is a timing chart illustrating the processing of when the sleep mode is reset concerning the case of a conventional construction, and FIG. 11B is the case of the construction of the embodiment. In the case of the conventional construction, when woke up, the CPU 2 becomes capable of making access to the flash ROM after the passage of the start setup period of the CR 41 cycles. The frequency multiplier circuit becomes capable of producing the machine clock MCLK after the passage of the start setup period since measurement of the period of the reference clock signal RCLK has been completed during this time point. In the case of this embodiment, on the other hand, the CPU 2 is capable of making access to the mask ROM 4 at a time point when it has woke up, and the frequency multiplying circuit 9, too, is capable of immediately producing the machine clocks MCLK as the first clock signals. When the sleep mode is reset, therefore, the CPU 2 immediately executes the wakeup processing.

Thereafter, as described with reference to FIG. 6, the frequency multiplier circuit 9 newly measures the period of the reference clock signals RCLK while the first clock signals are being output, and produces the second clock signals maintaining a high precision. Here, when the sleep mode that had been maintained for a predetermined period of time is reset, it is presumed that the environmental conditions such as ambient temperatures are varying before and immediately after the sleep mode, and it is probable that the period of oscillation of the reference clock signals RCLK is varying. Therefore, the first clock signals formed by commencing the oscillating operation under the oscillation control conditions held at a time point when the sleep mode was reset, start relatively quickly but their oscillating precision is relatively low. On the other hand, the second clock signals formed under the oscillation control conditions obtained by newly measuring the period of the reference clock signals RCLK while the first clock signals are being fed to the CPU 2, can be the to start relatively being delayed behind but have a relatively high oscillating precision.

According to this embodiment as described above, the CPU 2 forming the ECU 1 so works that, when it is shifted to the sleep mode, the oscillating operations of the oscillation circuit 8 and of the frequency multiplier circuit 9 are discontinued through the low power consumption control circuit 10, and that the external power source is disconnected from, or connected again to, the flash power source circuit 14 that feeds the power source for operation to the flash ROM 3 in response to the halt of oscillating operations of the circuits 8 and 9 by the low power consumption control circuit 10 or in response to the resumption of the halted operation. When shifted to the sleep mode, the frequency multiplier circuit 9 holds the oscillation control conditions set at that time point. When the oscillating operation is to be resumed after the reset of the sleep mode, the frequency multiplier circuit 9 operates based on the oscillation control conditions that are held to send the first clock signals of a relatively low precision to the CPU 2.

Therefore, when the sleep mode is reset, the frequency multiplier circuit 9 immediately starts the oscillating operation to feed the clock signals for operation to the CPU 2. When the sleep mode is reset, the CPU 2 at that time point makes access to the mask ROM 4 in a state where the data can be read out, and immediately reads the control program that is to be executed immediately after the wakeup and, hence, quickly starts the operation after the reset of the above mode. This improves the processing efficiency of the CPU 2.

While the first clock signals are being fed to the CPU 2, the frequency multiplier circuit 9 produces, as the second clock signals, clock signals formed under the oscillation control conditions obtained by newly measuring the period of the reference clock signals RCLK. Thus, the single frequency multiplier circuit 9 which oscillates based on a digital operation processing produces the first clock signals that are immediately needed at the start after the reset of the sleep mode and the second clock signals of a high oscillating precision.

Further, the CPU 2 sets the address selection register 43 to determine which one of the flash ROM 3 or the mask ROM 4 be accessed through the multiplexer 41 at the start. When a wakeup factor occurs, the multiplexer 40 so changes the address output through the multiplexer 41 as to be set to the program counter 35 instead of the program address of during the normal processing. At the start of the CPU 2, therefore, the memory for effecting the access can be selected depending upon the control program.

When the calculation of the start setup period by the ROM-STNBY timer 10c ends while the mask ROM 4 is being accessed, the CPU 2 changes the access to the flash ROM 3. That is, upon making reference to the ROMSTNBY timer 10c, the CPU 2 grasps that a sufficient period of time has passed after the sleep mode was reset and the flash power source circuit 14 is in a state of producing a power source voltage of a stabilized level, and determines the timing for changing the access over.

Second Embodiment

Figure 12:
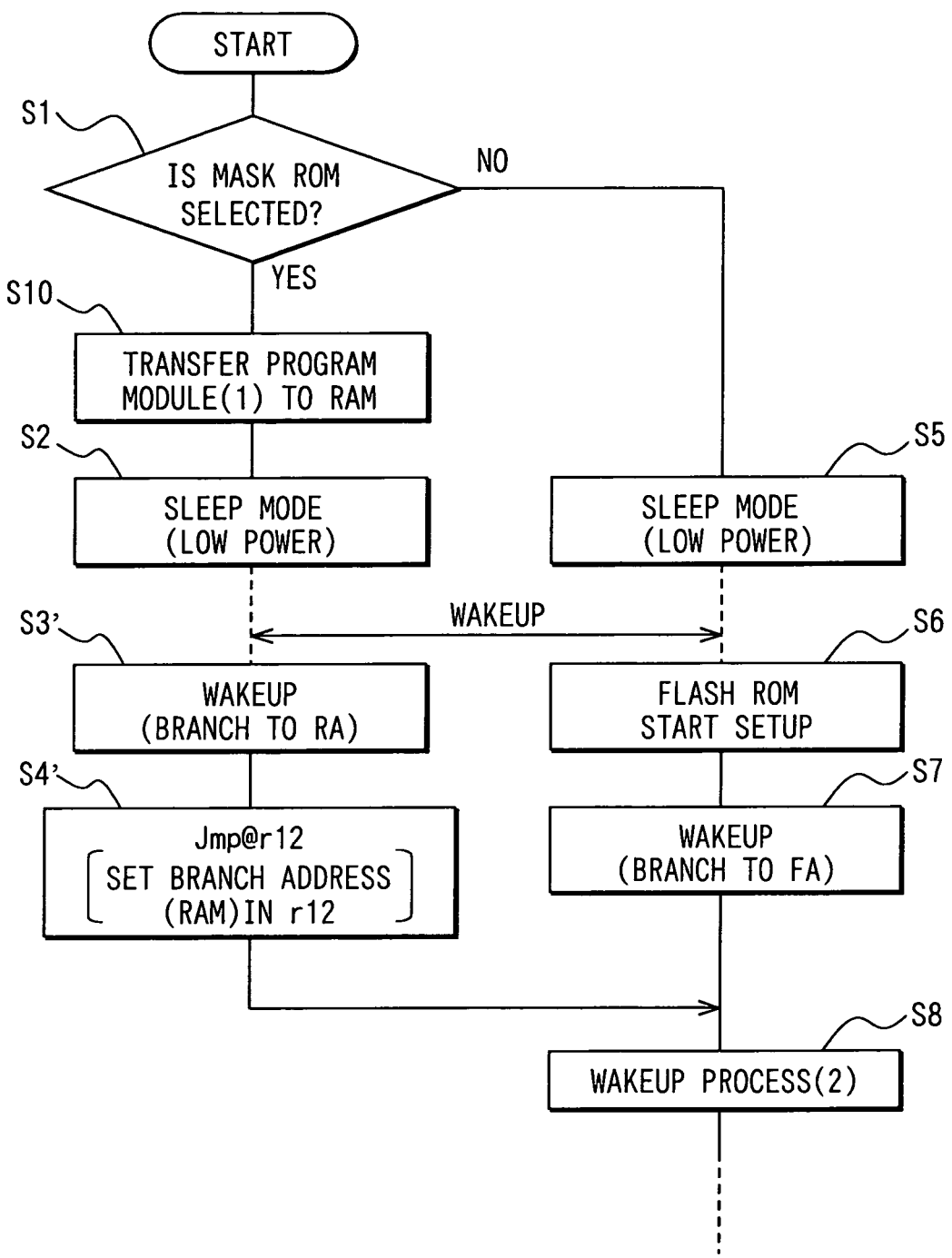
FIG. 12 is a flowchart illustrating processing of when the operation mode is changed by a CPU in the second embodiment.

FIGS. 12 and 13 illustrate a second embodiment. In this embodiment, the same parts as those of the first embodiment are denoted with the same reference numerals. The second embodiment is differentiated from the first embodiment in that the memory which will be accessed by the CPU 2 right after the wakeup is constructed by a RAM (start memory) 5 instead of the mask ROM 4 used in the first embodiment. In this case, an access address RA in the RAM 5 is set to the address table 42 in FIG. 7 instead of setting the address MA.

As shown in FIG. 12, when the determination at step S1 is "YES", the CPU 2 is shifted to the sleep mode after having transferred a program module in the wakeup processing (1) from the flash ROM 3 to a predetermined region in the RAM 5 at step S10. The data stored in the RAM 5 is held while being shifted to the sleep mode. When woke up, the CPU 2 at step S3' is branched to the address RA and, at a subsequent step S4', is branched to a head address in the wakeup processing (1) of the RAM 5 specified by the register r12.

Figure 13A:
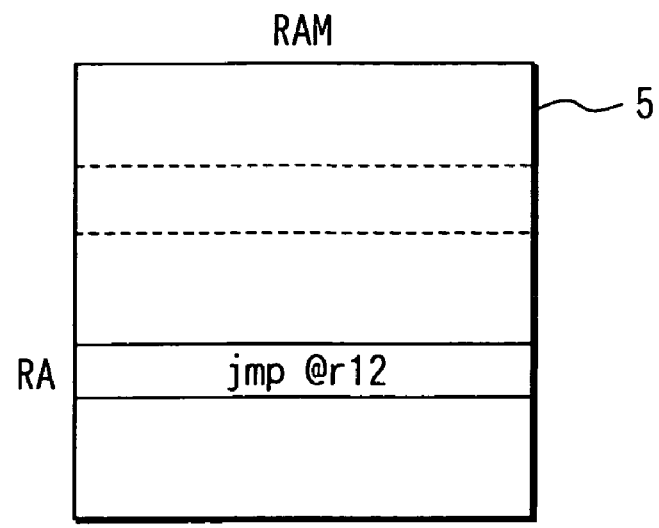
FIG. 13A is a schematic diagram of a RAM before a program module is transferred in the second embodiment.
Figure 13B:
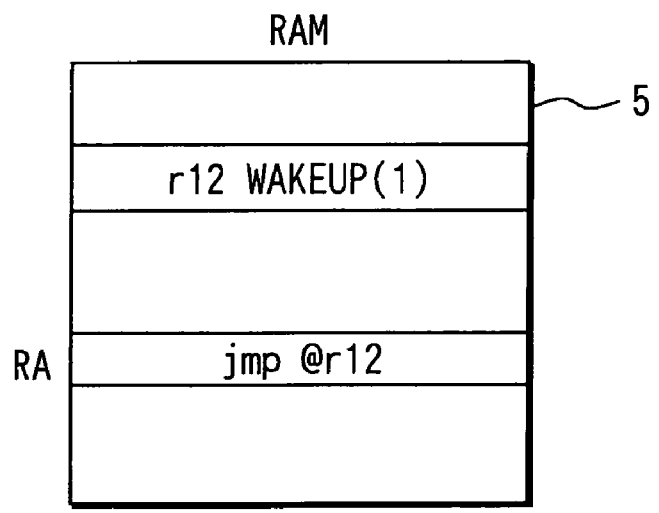
FIG. 13B is a schematic diagram of the RAM after the program module is transferred in the second embodiment.

That is, the above program module can be used only at the time of executing the wakeup processing. When the CPU 2 is effecting the normal processing, therefore, the program module transfer region in the RAM 5 can be used as an operation region as shown in FIG. 13A. Just before being shifted to the sleep mode, the CPU 2 transfers the program module to the RAM 5 as shown in FIG. 13B. After woke up, the address RA is set to the program counter 35 due to the change-over of the multiplexers 40, 41, and the CPU 2 immediately makes access to the RAM 5 to execute the program.

According to the second embodiment as described above, the CPU 2, that is shifted to the sleep mode, transfers the program module in the wakeup processing (1) from the flash ROM 3 into a predetermined region in the RAM 5 and, after woke up, makes access to the RAM 5. While the CPU 2 is executing the normal processing, therefore, the above transfer region of the RAM 5 can be used as a working region eliminating the need of constantly maintaining a redundant storage region that is used only when the sleep mode is reset and, hence, making it possible to efficiently use the resource.

Third Embodiment

Figure 14:
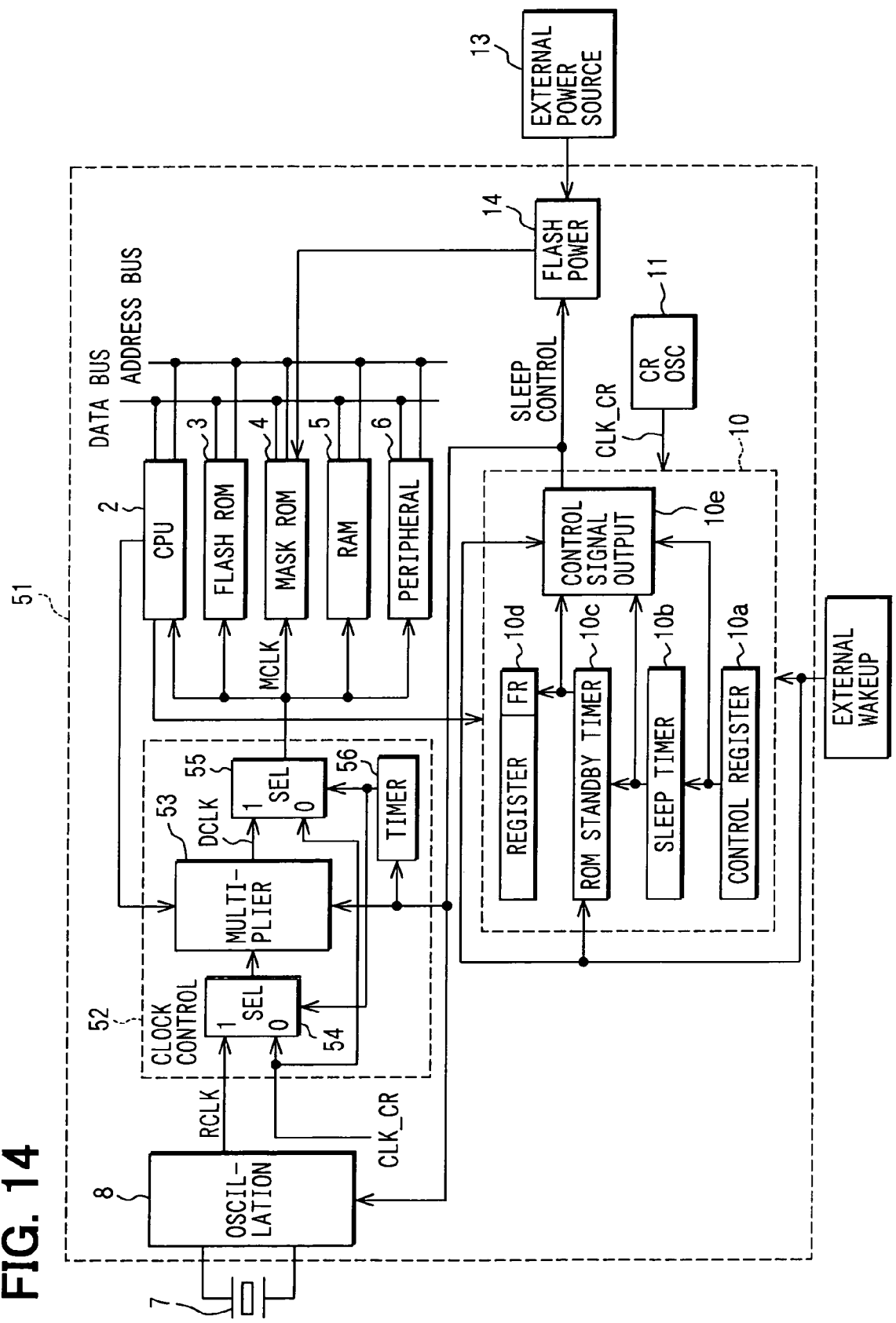
FIG. 14 is a functional diagram illustrating an electric construction of an ECU for a vehicle including a microcomputer according to a third embodiment of the present invention.

In a third embodiment shown in FIGS. 14 and 15, an ECU (microcomputer) 51 is the one in which the frequency multiplier circuit 9 in the first embodiment is replaced by a clock control circuit 52. A frequency multiplier circuit 53 is arranged in the clock control circuit 52. Unlike the frequency multiplier circuit 9, however, the frequency multiplier circuit 53 is not equipped with the frequency data-holding circuit portion 29 for holding the oscillation control conditions. Namely, the construction is the same as that of the conventional DPLL circuit.

Selectors (multiplexers) 54 and 55 are arranged on the input side and on the output side of the frequency multiplier circuit 53. The input terminal of the selector 54 on the input side receives reference clock signals RCLK output from the oscillation circuit 8 and clock signals CLK_CR output from the CR oscillation circuit 11. The selector 54 selects either one of them and outputs them to the frequency multiplier circuit 53. The input terminal of the selector 55 on the output side receives RCLK output from the frequency multiplier circuit 53 and multiplied clock signals DCLK output from the CR oscillation circuit 11. The selector 55 selects either one of them and outputs them as machine clocks MCLK.

The selectors 54 and 55 are selected based on an output signal from a switching timer 56. The switching timer 56 is reset when the sleep control signal SC becomes active (low) and starts counting the time when the sleep control signal SC becomes inactive (high) from the above state. When the counted value becomes equivalent to an oscillation stabilization wait time (predetermined time) Tw of the frequency multiplier circuit 53, the switch control signal applied to the selectors 54, 55 is changed from low to high to discontinue the counting operation. When the switch control signal that is applied is low, the selectors 54 and 55 select the side of the clock signal CLK_CR. When the switch control signal changes to high, the selectors 54, 55 select the side of the reference clock signal RCLK and the side of the multiplied clock signal DCLK, respectively.

In FIG. 15, a state where the CPU 2 in the ECU 51 is being shifted from the sleep mode to the normal operation mode is shown. The CR oscillation circuit 11 continues the oscillating operation even when the CPU 2 is being shifted to the sleep mode and, hence, the clock signals CLK_CR are produced at all times and can be used immediately ((a) and (b) in FIG. 15). When a wakeup factor occurs, the sleep control signal SC changes into inactive, and the CPU 2 is shifted to the normal operation mode and wakes up. Then, the switching timer 56 commences the counting operation.

Here, the selectors 54 and 55 are both selecting the side of the clock signals CLK_CR (first clock signals), and the CPU 2 operates using the above clock signals as machine clocks MCLK and makes access to the mask ROM 4 in the same manner as in the first embodiment. The oscillation circuit 8 and the frequency multiplier circuit 53, too, resume the oscillating operation. Here, however, the frequency multiplier circuit 53 starts the operation from measuring the period of the clock signals CLK_CR and it becomes necessary to wait for the passage of the oscillation stabilization wait time Tw until the multiplied clock signals DCLK are output in a stabilized form ((c) and (d) in FIG. 15).

The CPU 2 polls the ROMSTNBY timer 10c and confirms that the ROMSTNBY flag is reset in the same manner as in the first embodiment. Thereafter, the CPU 2 makes access to the flash ROM 3. Then, when the oscillation stabilization wait time Tw elapses and the switching timer 56 changes the switch control signal to be high, the selectors 54 and 55 select the sides of the reference clock signals RCLK and the multiplied clock signals DCLK, respectively. Then, the machine clocks MCLK are changed from the clock signals CLK_CR over to the stable multiplied clock signals DCLK. Thereafter, the frequency multiplier circuit 53 calculates the frequency multiplication by newly measuring the period of the reference clock signals RCLK and, thereafter, produces the second clock signals of a high oscillating precision ((d) in FIG. 15).

In the above case, the content processed by the CPU 2 includes the initialization processing after the start when access is being made to the mask ROM 4 immediately after wakeup as shown in (e) of FIG. 15 and, thereafter, the application is effected without requiring highly precise clocks while the flash ROM 3 is being accessed and while the machine clocks MCLK are the clock signals CLK_CR. After the machine clocks MCLK are changed over to the multiplied clock signals DCLK, the application is effected using highly precise clocks without arousing any problem in the real operation.

Even when the clock signals CLK_CR and the multiplied clock signals DCLK have different frequencies, they may be switched over leaving the frequency difference. Alternatively, the multiplication factor on the side of the frequency multiplier circuit 53 may be temporarily lowered or the oscillation frequency of the CR oscillation circuit 11 may be temporarily elevated to equalize the frequency at the time point of change over.

According to the third embodiment, the clock control circuit 52 is so constructed as to selectively produce the clock signals CLK_CR that start relatively quickly from the oscillation-halted state but have a low oscillating precision as produced by the CR oscillation circuit 11 as well as the multiplied clock signals DCLK that start relatively being delayed behind but maintaining a high oscillating precision as produced from the frequency multiplier circuit 53.

When the CPU 2 is shifted to the sleep mode, the oscillating operation of the frequency multiplier circuit 53 in the clock control circuit 52 is halted to lower the consumption of electric power. When the sleep mode is reset, the frequency multiplier circuit 53 resumes the oscillating operation in the clock control circuit 52 and, at the same time, the clock signals CLK_CR of the CR oscillation circuit 11 of which the oscillating operation is in a stable condition are fed to the CPU 2. After the passage of the oscillation stabilization wait time Tw, the CPU 2 is, then, fed with the multiplied clock signals DCLK of a high oscillating precision of which the oscillation has been stabilized.

Like the first embodiment, therefore, when the sleep mode is reset, the clock control circuit 52 immediately feeds the clock signals CLK_CR to the CPU 2. Despite the frequency multiplier circuit 53 is not provided with the frequency data holding circuit portion 29 for holding the oscillation control conditions, the period of the clock signals CLK_CR is newly measured while they are being input to form multiplied clock signals DCLK of a high oscillating precision which are, then, output after the passage of the oscillation stabilization wait time Tw.

The present invention is not limited to only those embodiments described above and shown in the drawings but can be implemented as described below.

The flash power source circuit 14 may be constructed in the flash ROM 3.

In the first embodiment, for example, the multiplexer 41 of FIG. 7 is not necessarily needed, and the mask ROM 4 may be accessed at all times immediately after the wakeup.

A circuit for forming a power source for operation, such as the CPU 2, may be mounted on the ECU 1.

When shifted to the sleep mode, the sleep timer 10b is not necessarily needed for resetting the sleep mode. For example, the construction may be such that the CPU wakes up only when an external wakeup factor appears.

When being shifted to the sleep mode in the third embodiment, the operation of the CR oscillation circuit 11 may be discontinued. In this case, however, a clock source must be separately provided for operating the low power consumption control circuit 10.

The second clock signals are not necessarily limited to those formed by the DPLL circuit. The second clock signals need possess a higher oscillating precision than that of the first clock signals and may, for example, be those formed by an analog DPLL circuit.

Not being limited to the ECU for vehicles, there can be extensively used any microcomputer of which the control program is stored in the nonvolatile memory and which can be shifted to the low power consumption mode.

What is claimed is:

1. A microcomputer comprising:
    a rewritable nonvolatile memory, which has a power source circuit forming a power source for own operation thereof based on a power source fed from an external unit, and stores a control program;
    a clock control circuit, which is so constructed as to selectively produce first clock signals that start relatively quickly from an oscillation halt state and have a relatively low oscillating precision and second clock signals that start relatively delayed from the oscillation halt state and have a relatively high oscillating precision, at least the second clock signals being produced using an oscillation output of an external oscillator as reference clock signals; and
    a CPU, which receives the clock signals produced by the clock control circuit and operates upon reading out the control program from the nonvolatile memory; wherein
    the CPU discontinues an oscillating operation of at least the second clock signals in the clock control circuit when the CPU is shifted to a low power consumption mode;
    the power source circuit of the nonvolatile memory is so constructed to interrupt the external power source when the CPU is shifted to the low power consumption mode and resume supply of the external power source when the low power consumption mode is reset;
    the control program read by the CPU when the low power consumption mode is reset is partly pre-arranged in a start memory which is capable of reading data at a time point when the low power consumption mode is reset;
    the clock control circuit resumes, when the low power consumption mode is reset, the oscillating operation for oscillating at least the second clock signals, feeds to the CPU the first clock signals of which the oscillation is in a stable state for only a predetermined period of time and, thereafter, feeds the second signals instead thereto; and
    the CPU reads the control program arranged in the start memory when started as a result of resetting the low power consumption mode.

2. The microcomputer according to claim 1, wherein the clock control circuit:
    executes digital operation processing to effect the oscillating operation at a frequency determined based on set oscillation control conditions, one of the oscillation control conditions being a data obtained by measuring a period of the reference clock signals;
    holds the set oscillation control conditions, when the oscillating operation is to be discontinued;
    commences immediately the oscillating operation based on the oscillation control conditions held to produce clock signals as the first clock signals, when the oscillating operation is to be resumed after the reset of the low power consumption mode; and
    produces, as the second clock signals, the clock signals formed based on the oscillation control conditions obtained by measuring the period of the reference clock signals while the first clock signals are fed to the CPU.

3. The microcomputer according to claim 1, wherein the CPU includes:
    a memory selection register which, at a time of start, selects which one of the nonvolatile memory or the start memory be accessed;
    a first multiplexer for selecting either one of the access address of the nonvolatile memory or the access address of the start memory; and
    a second multiplexer which, when a factor for resetting the low power consumption mode arises, sets the address output through the first multiplexer to the program counter instead of setting the program address used in normal processing.

4. The microcomputer according to claim 1, wherein:
    the start memory is constructed with a RAM; and
    the CPU is shifted to the low power consumption mode after executing the processing for transferring a part of the control program to the RAM.

5. The microcomputer according to claim 1, further comprising:
    an access inhibition timer for setting an inhibition period for inhibiting access to the nonvolatile memory from a time point when the oscillating operation of the clock control circuit is resumed,
    wherein the CPU accesses the start memory from a time point when the oscillating operation of the clock control circuit is resumed until when counting of the inhibition period by the timer is finished, and accesses the nonvolatile memory when the counting of the inhibition period by the timer is finished.

* * * * *